(12) United States Patent
Marsh et al.

(10) Patent No.: US 6,357,308 B1
(45) Date of Patent: Mar. 19, 2002

(54) PLASMA PROBE AND METHOD FOR MAKING SAME

(75) Inventors: Ricky Marsh, San Ramon; Stanley Siu, Castro Valley, both of CA (US)

(73) Assignee: Lam Research Corporation, Fremont, CA (US)

( * ) Notice: Subject to any disclaimer, the term of this patent is extended or adjusted under 35 U.S.C. 154(b) by 0 days.

(21) Appl. No.: 09/337,012

(22) Filed: Jun. 30, 1999

(51) Int. Cl.[7] .............................................. G01D 21/00
(52) U.S. Cl. ...................................................... 73/866.5
(58) Field of Search ....................... 73/866.5; 374/208, 374/163; 29/595, 857, 858, 869, 872, 873; 324/464, 438, 696, 448

(56) References Cited

U.S. PATENT DOCUMENTS 4,454,370 A * 6/1984 Voznick ....................... 374/208
5,942,701 A * 8/1999 Kamiya ....................... 73/866.5

* cited by examiner

Primary Examiner—Robert Raevis
(74) Attorney, Agent, or Firm—Martine & Penilla, LLP

(57) ABSTRACT

A probe for measuring properties of plasma includes a shell, a contact extending through the shell and having a first connecting portion positioned in the shell, and a connector guide attached to a second connecting portion, the second connecting portion being detachably coupled to the first connecting portion. In another embodiment, a probe for measuring properties of plasma includes a shell, a contact extending through the shell, wiring extending from the contact and along an interior of the shell, and a coolant inlet line for injecting coolant into the interior of the shell for cooling the wiring. A method for cooling wiring positioned in an interior of a probe includes providing a coolant inlet line for injecting coolant into the interior of the probe and inserting the coolant inlet line in the interior of the probe such that the coolant cools the wiring. A method for assembling a probe having a shell and a contact extending through the shell and having a first connecting portion positioned in the shell includes attaching a connector guide to a second connecting portion adapted for detachably coupling to the first connecting portion and inserting the second connecting portion and the connector guide into the shell of the probe such that the second connecting portion becomes detachably coupled to the first connecting portion, the connector guide being for aligning the second connecting portion with the first connecting portion.

13 Claims, 6 Drawing Sheets

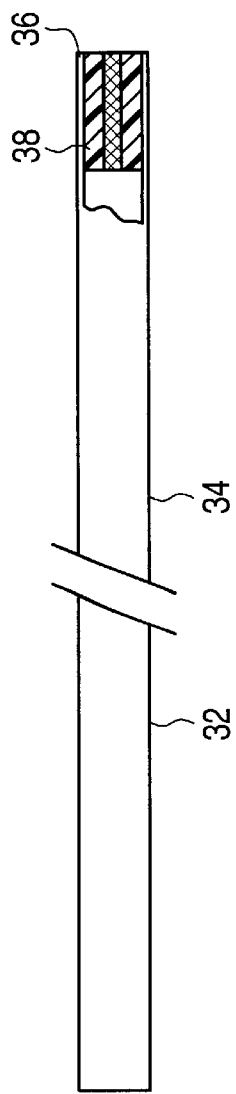
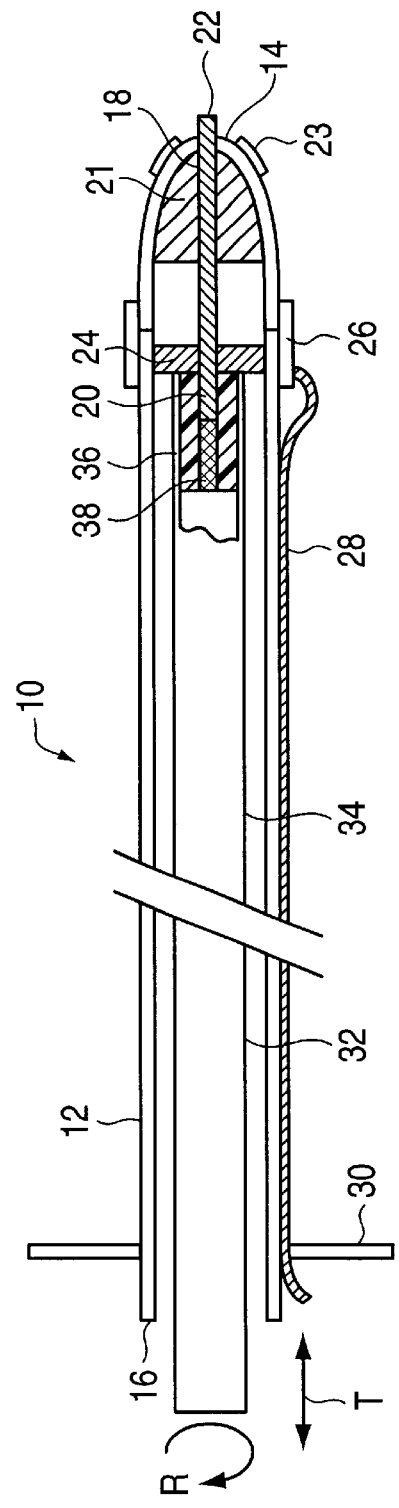

PLASMA PROBE AND METHOD FOR MAKING SAME

BACKGROUND OF THE INVENTION

This invention relates generally to plasma probes, and more particularly to the construction and assembly of Langmuir probes used to measure properties of plasma, such as electron density and temperature.

FIG. 1 illustrates a conventional Langmuir probe. A typical Langmuir probe 1 includes an elongated shell 2 with a closed end 3 and an open end 4 and is constructed of a dielectric, such as a ceramic material. An electrically conductive contact 5 extends through the closed end of the shell. The contact 5 forms a node 7 (shown here as a male pin connector) positioned within the shell 1. An exposed portion of the contact 5 may be placed in direct contact with a plasma. A hermetic seal 6 may be positioned in the interior of the shell towards the sealed end to prevent plasma from entering the interior of the shell. The contact 5 extends through the hermetic seal 6, such that the tail end of the contact forms the male pin connector. Some probes have electrically conductive slugs 8 positioned around the contact and in the shell between the hermetic seal and the closed end of the shell to create a dielectric effect. In such probes, the contact 5 may be divided into forward and rearward sections 5a,5b with the slug 8 providing electrical conductance between the sections 5a,5b.

A female pin connector 9 is detachably coupled to the node 7. Wiring W runs from the female pin connector 9 and through the open end 4 of the Langmuir probe 1. The free end of the wiring W can be attached to a measuring device which measures the potential created in the Langmuir probe 1. The wiring W is usually a coaxial cable with a nonconductive outer sheathing covering a braided wire shielding. The wiring W may be biased with potential from a power source. An RF inductor filter R may be coupled inline with the wiring W. The outer diameter of the filter R is smaller than the inner diameter of the shell 2 but may have an external diameter close to the internal diameter of the shell 2.

A conductive ring 11 may be provided around the shell 2 near the closed end 3 of the shell 2 to serve as a reference electrode. An electrically shielded grounding wire 13 is connected to the conductive ring 11. Also, an electrically conductive sleeve 17 may extend around the closed end 3 of the shell 2. A Conflat® fitting 15 extends around the Langmuir probe 1 towards the open end 4. The Conflat® fitting 15 seals against the container holding the plasma.

Semiconductor fabrication equipment often use plasma processing. Exemplary processes in which plasma is used are dry-etching of semiconductors for microcircuits and plasma enhanced chemical vapor deposition (CVD). When performing semiconductor etching and deposition, it is best to have uniformity of the ion current density in the plasma reactor chamber. Such uniformity can be created by measuring the density distribution of the plasma during testing and making adjustments to the plasma reactor chamber and the operating conditions. During fabrication, the ion current density can be checked, and if required, adjustments to reach uniformity may be made.

Langmuir probes 1 can be used to measure properties of plasma, such as when conducting testing and diagnostics in the processes described above. The electron density and temperature of plasma can be derived from Langmuir probe 1 measurements through the analysis of the current-potential characteristics of the plasma. The contact 5 of the Langmuir probe 1 is a conductor, and when placed in direct contact with moving charged particles found in the plasma, a current flows through the Langmuir probe 1. Based on the change in potential within the probe 1, an estimation of the temperature and density of the electrons in the plasma can be made.

During the measurement of the properties of the plasma, the Langmuir probe 1 heats up due to the current flowing through the wiring W and due to the exposure of the probe 1 to the plasma. Probe 1 heating can lead to deterioration of the probe 1 both mechanically and with respect to the RF filter R. Deterioration of the filter R can lead to total probe failure, or to a detuning of the filter R leading to high RF noise and resulting in inaccurate or misleading results. If the filter R becomes damaged and inoperable from the heat, the only remedy is to replace the filter R, which is a difficult and time consuming task.

Furthermore, the heat to which the probe 1 is exposed may cause the nonconductive shielding of the wiring W to melt, allowing core wires to come in contact with braided wire shielding and to cause a short. When this occurs, the wiring W must be replaced.

Yet another problem encountered with prior art Langmuir probes 1 is that the node 7 and female pin connector 9 becomes corroded due to the heat. Corrosion causes increased electrical resistance and must be removed for optimum electrical connectivity. However, because the contact 5 is fixed by the hermetic seal 6, the node 7 is accessible only through the interior of the shell 2. This makes removal of the oxidization very difficult, as cleaning must be accomplished through the open end 4 of the shell 2. Thus, the wiring W must be removed before cleaning can take place.

To replace the wiring W, the old wiring W, filter R, and female pin connector 9 are pulled from the shell 2 of the probe 1. New wiring, filter and female pin connector are then assembled. Generally, the wiring W is rigid enough to permit pushing of the female pin connector 9 into engagement with the node 7 during reassembly. However, because of the flexibility of the wiring W and the dimensionsof the shell 2, i.e., very long with a small lumen, alignment of the female pin connector 9 with the node 7 so that they may be reattached is very difficult. The size of the filter R generally prohibits insertion of tools to guide the female pin connector 9. Thus, a great deal of time may be spent attempting to reattach the node 7 and female pin connector 9. Further, once the probe 1 is reassembled, there is a strong probability that the interior of the probe 1 will overheat and the shielding on the wire will melt once again or the filter R will be damaged, again requiring disassembly and reassembly.

Even still another problem with prior art Langmuir probes 1 is that the current flowing through the wiring W fluctuates, creating RF "noise". An RF induction filter R helps remove some of the noise, but much of the noise remains, which makes taking precise measurements difficult. Further, the filter R cannot be tuned to block different frequencies. Rather, the filter R must be removed and another filter that blocks the desired frequencies installed.

SUMMARY OF THE INVENTION

The present invention is a plasma probe that is much more heat tolerant than prior art Langmuir probes. Conduction and convection are utilized to remove heat from the interior of the probe, thereby reducing the occurrence of melted wiring and heat damage to filters. Also, the present invention assembles much more easily than known probes. Furthermore, the present invention uses capacitance to overcome the limitations of the prior art with respect to the filtering of noise when taking readings with the probe.

The present invention includes rigidly attaching the connector guide to a second connecting portion (e.g., a female pin guide) of a plasma probe to align the second connecting portion with a first connecting portion (e.g., a male pin guide). The guide has an outer diameter that is almost equal to but slightly smaller than the inner diameter of the shell. As the wiring is pushed into the shell, the guide slides along the interior of the shell and guides the second connecting portion into attachment with the first connecting portion. Thus, rapid assembly and disassembly are possible, permitting even routine maintenance to be performed more quickly than in the past.

As noted previously, the current flowing through the wiring fluctuates, making taking precise measurements difficult due to inductive effects. In an embodiment of the present invention, the guide is constructed of an electrically conductive material to provide a capacitance between the guide and plasma outside the probe. That is, the guide forms one plate of a capacitor, the plasma forms another plate, and the shell acts as a dielectric. In this way a large capacitance is created which filters the variations in current to reduce the noise developed on the signal traveling through the wiring of the probe.

To reduce the damage caused by heat in the interior of the shell, the guide may also act to cool the second connecting portion and the nearby wiring, thereby reducing the probability of meltdown of the components of the wiring and helping to prevent oxidation of the first and second connecting portions. In such case, the guide is preferably thermally conductive to guide heat away from the second connecting portion. To increase the cooling effect of the guide even more, at least one cooling fin may extend from a rear face of the guide.

To enhance the cooling function of the guide, or used without the guide, a coolant inlet line may be inserted in the shell. The coolant inlet line injects coolant (preferably air) into an interior of the shell to provide convective cooling for the guide and wiring in the interior of the shell. The coolant may comprise air or another substance such as nitrogen gas. Optionally, a coolant outlet line may be inserted in the interior of the shell to assist the escape of coolant from the interior of the shell. For maximum cooling effect, an opening of the coolant outlet line should be positioned towards an end of the shell opposite the first connecting portion so that the length of the interior of the shell and the internal components therein are cooled. The coolant inlet line may be coupled to the wiring before inserting the second connecting portion and the guide into the shell of the probe during assembly.

Before inserting the second connecting portion and the guide into the shell of the probe, the first connecting portion may be cleaned to remove any oxidation caused by overheating or simply from general use. A cleaning device that can be used has an elongate shaft with an open end and an abrasive inner lining positioned towards the open end of the shaft. The abrasive inner lining is rubbed on the first connecting portion for cleaning unwanted material from the first connecting portion.

An advantage of embodiments of the present invention is that the internal components of the probe can be more easily removed and replaced than was heretofore possible. This is particularly useful when performing periodic maintenance or replacing components.

Another advantage of embodiments of the present invention is that the capacitance created by the guide reduces signal noise. This allows measurements to be taken which are much more accurate than ever before.

Yet another advantage of embodiments of the present invention is that the internal components of the probe last much longer due to internal convective cooling of the components. Furthermore, signal noise is reduced due to a lower operating temperature of the probe.

These and other advantages of the present invention will become apparent to those skilled in the art upon a reading of the following descriptions of the invention and a study of the several figures of the drawing.

BRIEF DESCRIPTION OF THE DRAWINGS

FIG. 2a is a partial breakaway view of a cleaning device;

FIG. 3 is a cross sectional view of a probe illustrating cleaning of a first connecting portion with the cleaning device of FIG. 2a;

DETAILED DESCRIPTION OF THE PREFERRED EMBODIMENTS

Figure 1:
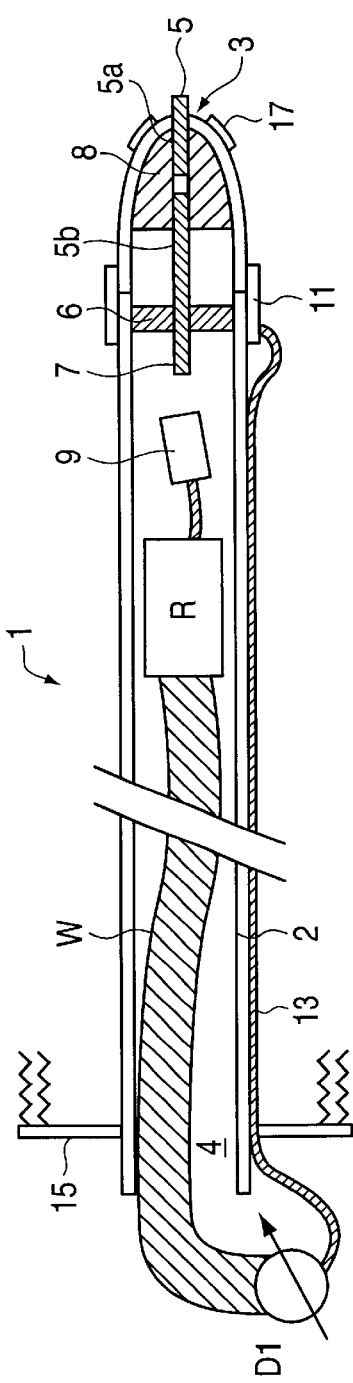
FIG. 1 is a cross sectional view of a prior art Langmuir probe.
Figure 2:
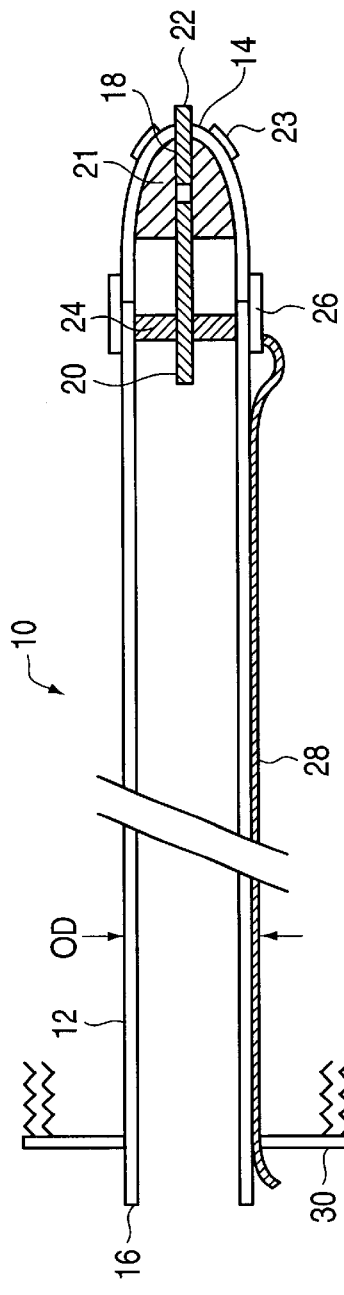
FIG. 2 is a cross sectional view of a partially assembled probe of the present invention without internal components.

FIG. 1 was discussed with reference to the prior art. In FIG. 2, an elongated tubular shell 12 of a probe 10 includes a closed end 14 and an open end 16. The shell 12 is constructed of a dielectric, such as a ceramic material, e.g., alumina. An exemplary length of the shell 12 between its ends is less than about one meter with an outer diameter OD of the shell 12 being about ⅜ inch. An electrically conductive contact 18 extends through the closed end 14 of the shell 12. The contact 18 has a first connecting portion 20, shown here to be formed as a male pin connector, positioned in the shell 12. The exposed portion 22 of the contact 18 may be placed in direct contact with a plasma. An electrically conductive holding portion 21 may be positioned in the shell 12 towards the closed end 14 of the shell through which the contact 18 extends. Optionally, the contact 18 may be divided into forward and rearward sections corresponding to the first connecting portion and the exposed portion with the holding portion 21 providing electrical conductance between the sections of the contact 18. This permits removal of the exposed portion 22 of the contact 18 for replacement in the event it becomes damaged. Also optionally, an electrically conductive sleeve 23 may extend around the exterior of the closed end 14 of the shell 12. The sleeve 23 acts as a passive filter. Preferably, both the holding portion 21 and the sleeve 23 are made of metal.

A hermetic seal 24, also of a dielectric such as a ceramic, may be positioned in the interior of the shell 12 towards the sealed end to inhibit plasma from entering the interior of the shell 12. The contact 18 extends through the hermetic seal 24.

A conductive ring 26 coated in a dielectric material such as a ceramic material extends at least partially around the shell 12 near the closed end 14 of the shell 12. An electrically shielded grounding wire 28 extends from the conductive ring 26. A Conflat® fitting 30 extends around the shell towards the open end 16. The Conflat® fitting 30 can be used for mounting or sealing the probe to a container holding plasma. For example, the Conflat® fitting 30 may be attached to a bellows that extends and retracts as the probe 10 is moved in and out of contact with the plasma.

Before assembling the probe 10, the first connecting portion 20 is preferably cleaned to remove any oxidation caused by overheating or from general use. A cleaning device 32 that may be used is shown in FIG. 2a. The cleaning device 32 has an elongate shaft 34 with an open end 36 and an abrasive inner lining 38 positioned towards the open end 36 of the shaft 34. To construct such a cleaning device 32, a braided wire core of a coax cable may be deformed to place the braided wires in disorder and then pushed about one half inch into the open end 36 of the shaft 34 until flush with the open end 36 of the shaft 34, for example. The braided wire core may be secured to the shaft 34, such as by soldering to form the abrasive inner lining 38. A hole approximately the size of the first connecting portion 20 is poked in the braided wire.

Referring to FIG. 3, the cleaning device 32 is inserted in the interior of the shell 12 until the first connecting portion 20 is inserted in the open end 36 of the shaft 34. The abrasive inner lining 38 engages the first connecting portion 20 for cleaning unwanted material from the first connecting portion 20. The shaft 34 may be rotated as indicated at R and moved on and off of the first connecting portion 20 by translating the device 32 as is indicated at T to scour the first connecting portion 20 with the abrasive inner lining 38.

Figure 4:
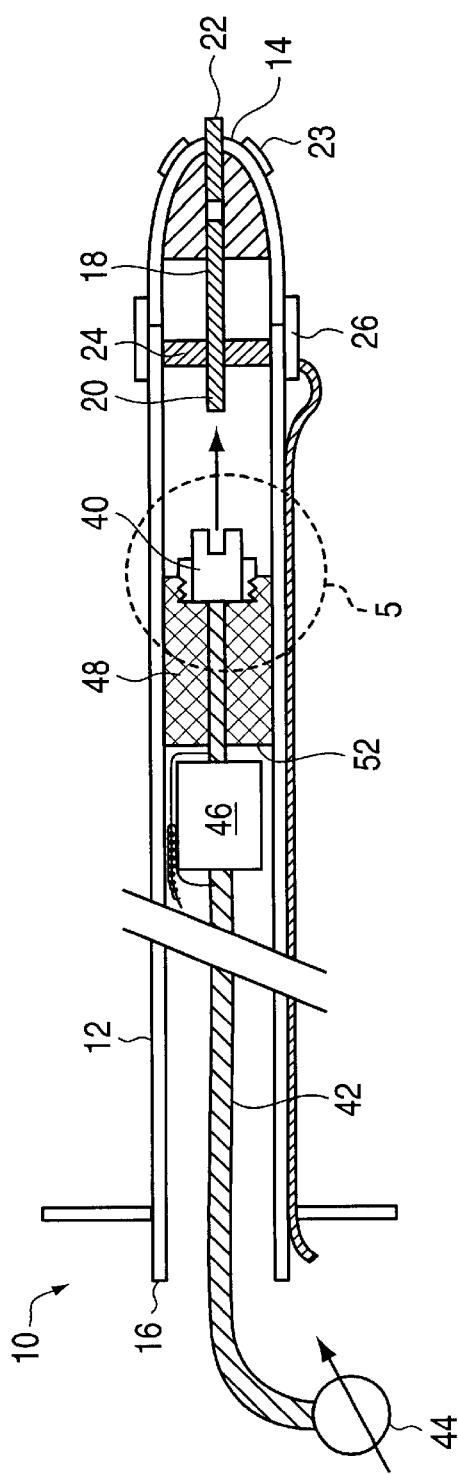
FIG. 4 is a cross sectional view illustrating components being inserted in a probe.

FIG. 4 shows a second connecting portion 40 that is adapted to detachably couple to the first connecting portion 20 to make a mechanical and electrical connection herewith. An exemplary second connecting portion 40 is a female pin connector. The second connecting portion 40 is connected to wiring 42. The wiring 42 runs from the second connecting portion 40 and through the open end 16 of the shell 12 of the probe 10. The free end of the wiring 42 can be attached to a measuring device (not shown) which measures the potential created in the wiring 42. The wiring 42 is preferably a coaxial cable with a nonconductive outer sheathing covering a braided wire shielding. The braided wire shielding is separated from at least one inner wire by a layer of insulation. The wiring 42 may be biased with potential from a power source 44. A filter 46 may be coupled to the wiring 42. Such a filter 46 could be an RF induction filter for reducing RF noise in a signal passing through the wiring 42.

A connector guide 48 is rigidly attached to the second connecting portion 40 to align the second connecting portion 40 with the first connecting portion 20. The wiring 42 can be coupled to the front 50 and back 52 of the connector guide 48 if the connector guide 48 is electrically conductive, or the wiring 42 may extend through the connector guide 48.

Figure 5:
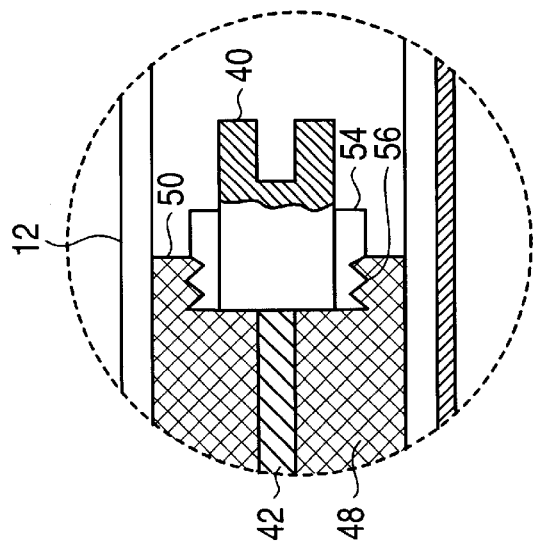
FIG. 5 is a detailed view of the portion of the probe encircled at 5 in FIG. 4, illustrating in greater detail the connector guide and the second connecting portion.

The connector guide 48 may be attached to the second connecting portion 40 in any suitable manner, including threaded engagement, welding, press fitting, soldering, swaging, etc. Preferably, the connector guide 48 is connected directly to the second connecting portion 40 to maximize heat transfer between the connector guide 48 and the second connecting portion 40. However, if it is desired to electrically isolate the connector guide 48 and the second connecting portion 40 while still permitting some thermal conduction between the connector guide 48 and the second connecting portion 40, heatshrink tubing 54 may be placed around the second connecting portion 40 and heat applied to shrink the heatshrink tubing 54 to the connecting portion 40. See FIG. 5. The connector guide 48 is then screwed and/or pushed onto the second connecting portion 40 such that threads of a threaded bore 56 of the connector guide 48 engage the heatshrink tubing 54.

The connector guide 48 is preferably shaped like the interior of the shell and has an outer diameter that is almost equal to but slightly smaller than the inner diameter of the shell 12 so that the connector guide 48 is guided by the interior surfaces of the shell 12. Thus the connector guide 48 preferably holds the second connecting portion 40 centrally with respect to the interior of the shell 12. As the wiring 42 is pushed into the shell 12, the connector guide 48 slides along the interior of the shell 12 and guides the second connecting portion 40 into attachment with the first connecting portion 20.

The connector guide 48 may be constructed of an electrically conductive material, such as a metal like aluminum or copper, for producing a capacitance between the connector guide 48 and plasma outside the probe 10 with the shell 12 acting as the dielectric. In this way a large capacitance is created to reduce noise on the signal probe. Alternatively, the connector guide 48 may be constructed of a dielectric such as a ceramic material for producing a smaller capacitance between the wiring 42 extending through the connector guide 48 and plasma outside the probe 10. Optionally, the connector guide 48 may comprise a nonconductive material, such as a plastic or alumina, if no capacitance is desired. If the connector guide 48 is constructed of a nonconductive material, it may have limited RF filtering and heat dissipation benefits.

To reduce the damage caused by heat in the interior of the shell 12, the connector guide 48 preferably is used to cool the second connecting portion 40 and the nearby wiring 42, thereby reducing the chance of meltdown of the components of the wiring 42 and helping to prevent oxidation of the first and second connecting portion 40s. In such case, the connector guide 48 is preferably constructed of a thermally conductive material to serve as a heat sink, which dissipates heat by conduction along the shell and by convection with gasses in the shell. To aid in convection, at least one cooling fin 58 may extend from a rear face of the connector guide 48 (see FIG. 9). There, convection carries heat from the guide 48 to the air in the interior of the shell 12.

Figure 6:
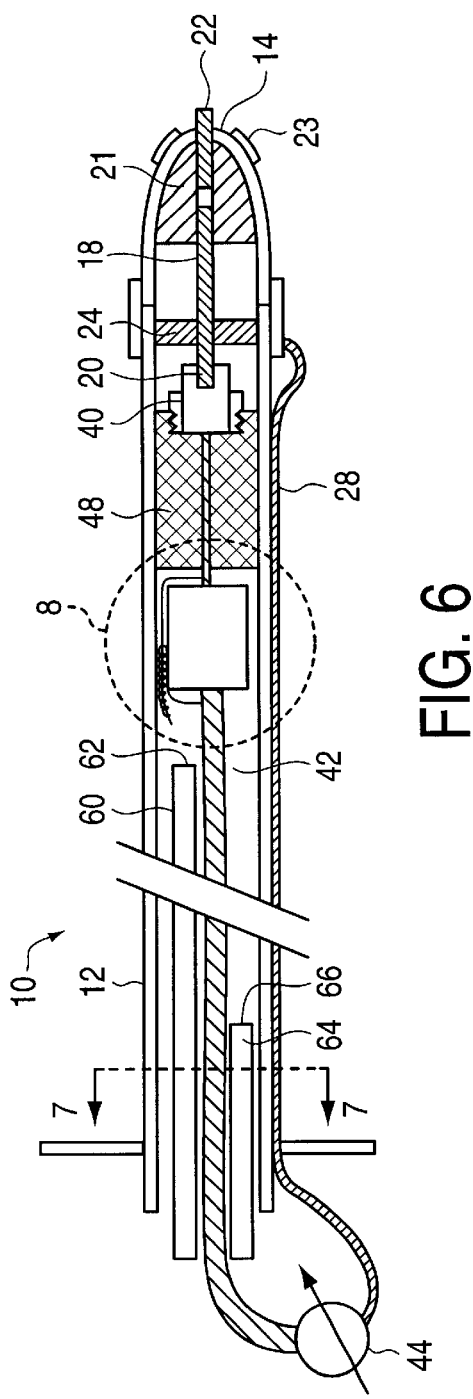
FIG. 6 is a cross sectional view of an assembled probe of the present invention.

FIG. 6 illustrates a convective cooling system for a probe of the present invention. The cooling system includes a coolant inlet line 60 inserted in the shell 12 which injects coolant into an interior of the shell 12 to enhance the cooling function of the connector guide 48 by convectively cooling the connector guide 48, filter 46, and wiring 42 in the interior of the shell 12. When used in an embodiment without the connector guide 48, the coolant inlet line 60 cools the second connecting portion 40, wiring 42, and the filter 46. The coolant may comprise air or another substance such as nitrogen gas. The pressure of the coolant in the coolant inlet line 60 can be adjusted, such as with a valve (not shown), to adjust the rate of flow of the coolant, thereby adjusting the rate of cooling. For example, a pressure of 80 psi with air as the coolant may be used to produce good cooling results in a shell 12 of the aforementioned dimensions.

Optionally, a portion of the coolant inlet line 60 may be coupled to a portion of the wiring 42, such as by binding or adhering them together as with tape or adhesive, before inserting the second connecting portion 40 and the connector guide 48 into the shell 12 of the probe during assembly. This ensures proper positioning of the outlet 62 of the coolant inlet line 60 with respect to the wiring 42. Further, coupling the coolant inlet line 60 to the wiring 42 adds support to the wiring 42, reducing damage to the wiring 42 during assembly and disassembly of the probe 10 and allowing the use of thinner wiring.

Also optionally, a coolant outlet line 64 may be inserted in the interior of the shell 12 for assisting the escape of coolant from the interior of the shell 12. The coolant outlet line 64 reduces pressure buildup in the interior of the shell 12, and may be necessary if the open end 16 of the shell 12 needs to be sealed shut. For maximum cooling effect, an opening 66 of the coolant outlet line 64 should be positioned towards an end of the shell 12 opposite the first connecting portion 20 so that a large portion of the length of the interior of the shell 12 and the internal components found therein are cooled. For example, with a shell 12 having a length of about one meter, the coolant outlet line 64 should extend about eight to ten inches into the shell 12 from the open end 16 of the shell 12.

Figure 7:
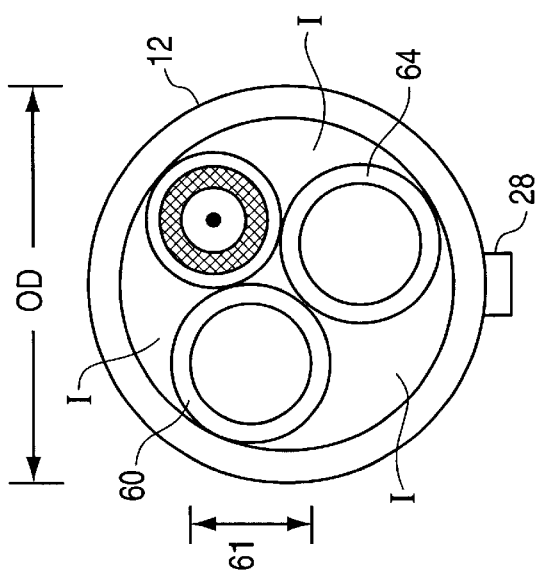
FIG. 7 is a cross sectional view of the probe along line 7—7 of FIG. 6.

FIG. 7 illustrates the positioning of the coolant inlet line 60, coolant outlet line 64, and wiring 42 with respect to each other in the interior of the shell 12. For a shell 12 having an outer diameter OD of $3/8$ inch, thin walled air tubes having an inner diameter 61 of $1/8$ inch may be used. As shown, some coolant is allowed to escape from the shell 12 through interstices I between the coolant lines 60,64 and wiring 42.

Figure 8A:
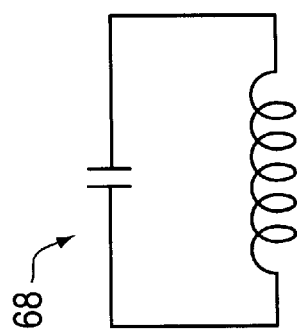
FIG. 8a shows the equivalent circuit of the tuning capacitor of FIG. 8.
Figure 8:
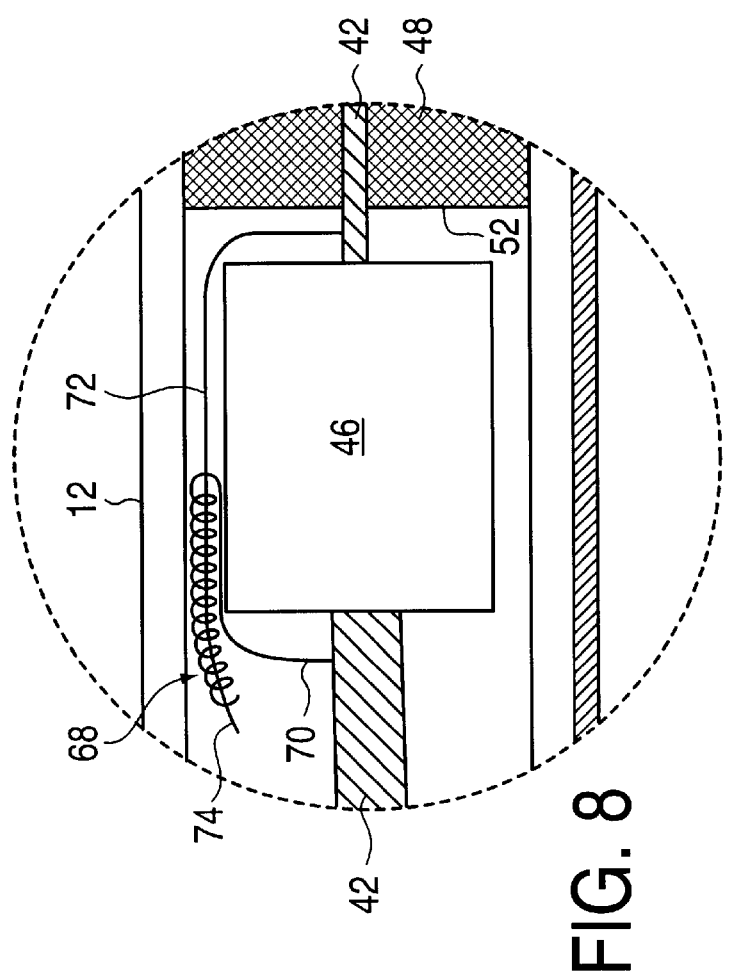
FIG. 8 is a detailed view of a filter as encircled by circle 8 of FIG. 6.

In FIG. 8, a filter 46 is shown including a tuning capacitor 68. The tuning capacitor 68 creates a small amount of capacitance that allows tuning of a frequency of a signal passing through the wiring 42. To create the tuning capacitor 68, a first wire 70 is coupled to the wiring 42 on one side of the filter 46. A second wire 72 is coupled to the wiring 42 on the other side of the filter 46. The first and second wires 70,72 are twisted together to produce a small capacitance, e.g., a few picofarads. By adjusting a number of twists of the first and second wires 70,72, the LC constant of the filter 46 may be adjusted.

Each of the wires 70,72 is shielded and the ends 74 of the wires are not electrically connected. To allow precision tuning, the material of which the shielding is constructed may be changed. For example, teflon, plastic, and silicon shielding each yield a different capacitance.

Figure 9:
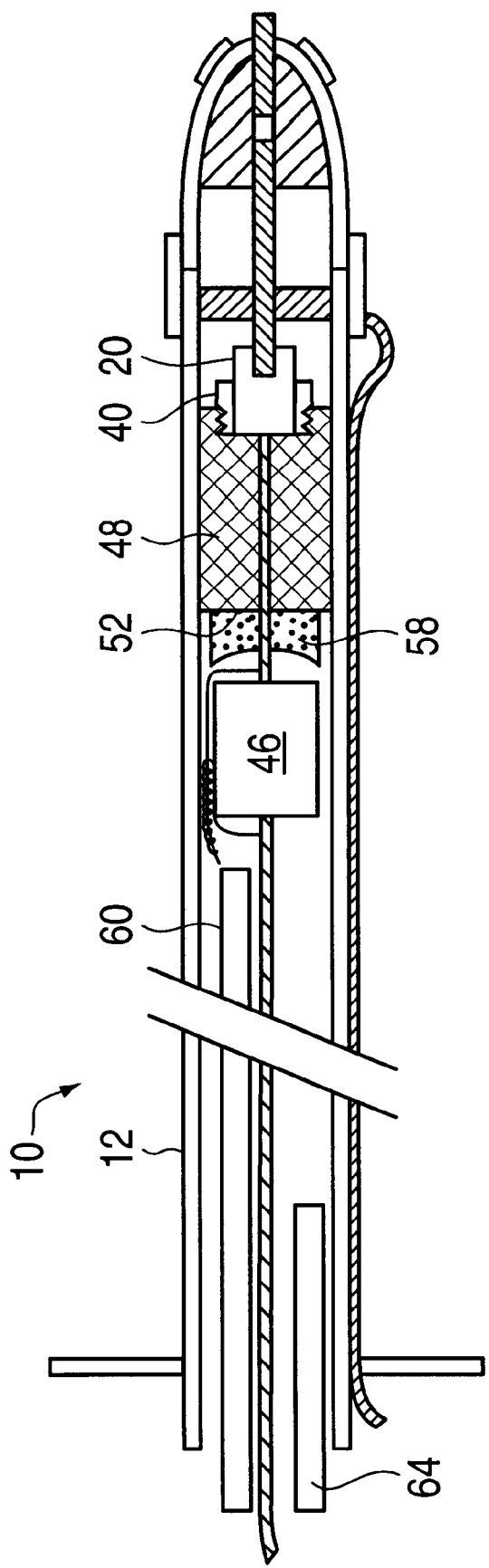
FIG. 9 is a cross sectional view of a new fully assembled probe in which the connector guide has heat dissipating fins.

FIG. 9 illustrates a fully assembled probe 10 of the present invention. In use, the closed end 14 of the probe is inserted in plasma such that the first connecting portion 20 is in contact with the plasma to create a current flow through the probe 10. Based on the change in potential within the probe 10, an estimation of the temperature and density of the electrons in the plasma can be made. The number and twists of the first and second wires 70, 72 can be changed to adjust the LC constant of the filter 46.

While this invention has been described in terms of several preferred embodiments, there are alterations, permutations, and equivalents which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method for assembling a probe having a shell and a contact extending through said shell and having a first connecting portion positioned in said shell comprising:

attaching a connector guide to a second connecting portion adapted for detachably coupling to said first connecting portion;

attaching a filter to said second connecting portion, and inserting said second connecting portion and said connector guide and said filter into said shell of said probe such that said second connecting portion becomes detachably coupled to said first connecting portion, said connector guide being for aligning said second connecting portion with said first connecting portion.

2. A method for assembling a probe as set forth in claim 1 further comprising cleaning said first connecting portion before inserting said second connecting portion and said connector guide into said shell of said probe.

3. A method for assembling a probe as set forth in claim 2 wherein cleaning said first connecting portion is performed with a cleaning device comprising an elongate shaft having an open end and an abrasive inner lining positioned towards said open end of said shaft, said abrasive inner lining engaging said first connecting portion for cleaning unwanted material from said first connecting portion.

4. A method for assembling a probe as set forth in claim 1 wherein said connector guide comprises an electrically conductive material for producing a capacitance.

5. A method for assembling a probe as set forth in claim 1 wherein said connector guide is thermally conductive for transporting heat away from said second connecting portion.

6. A method for assembling a probe as set forth in claim 5 wherein said connector guide has at least one cooling fin extending from a rear face thereof.

7. A method for assembling a probe as set forth in claim 1 further comprising inserting a coolant inlet line in said shell, said coolant inlet line injecting coolant into an interior of said shell for convectively cooling said interior of said shell.

8. A method for assembling a probe as set forth in claim 7 further comprising inserting a coolant outlet line in said interior of said shell for assisting escape of coolant from said interior of said shell.

9. A probe for measuring properties of plasma comprising:

a shell;

a contact extending through said shell and having a first connecting portion positioned in said shell;

a connector guide attached to a second connecting portion, said second connecting portion being detachably coupled to said first connecting portion, and a filter disposed within said shell and in electrical communication with said second connecting portion.

10. A probe for measuring properties of plasma as set forth in claim 9 wherein said connector guide comprises an electrically conductive material for producing a capacitance.

11. A probe for measuring properties of plasma as set forth in claim 9 further comprising a coolant inlet line positioned in said shell, said coolant inlet line injecting coolant into an interior of said shell for convectively cooling said connector guide.

12. A probe for measuring properties of plasma as set forth in claim 11 wherein said coolant inlet line is coupled to wiring extending from said connector guide.

13. A probe for measuring properties of plasma as set forth in claim 9 wherein wiring is coupled to said filter, a first wire is coupled to said wiring on one side of said filter and a second wire is coupled to said wiring on the other side of said filter, and said first and second wires are twisted together to produce a capacitance.

* * * * *